(12) United States Patent
Sivinski

(10) Patent No.: US 10,779,463 B2
(45) Date of Patent: Sep. 22, 2020

(54) ROW PLANTER LOCK ASSEMBLY

(71) Applicant: Harvest International, Inc., Storm Lake, IA (US)

(72) Inventor: Jeffrey Alan Sivinski, Cherokee, IA (US)

(73) Assignee: Harvest International, Inc., Storm Lake, IA (US)

( * ) Notice: Subject to any disclaimer, the term of this patent is extended or adjusted under 35 U.S.C. 154(b) by 20 days.

(21) Appl. No.: 15/787,208

(22) Filed: Oct. 18, 2017

(65) Prior Publication Data

US 2018/0103573 A1    Apr. 19, 2018

Related U.S. Application Data

(60) Provisional application No. 62/409,949, filed on Oct. 19, 2016.

(51) Int. Cl.
| | |
|---|---|
| *A01C 7/20* | (2006.01) |
| *A01B 63/00* | (2006.01) |
| *A01B 63/26* | (2006.01) |
| *A01C 1/00* | (2006.01) |
| *A01B 61/04* | (2006.01) |
| *A01B 63/10* | (2006.01) |
| *A01B 73/00* | (2006.01) |

(52) U.S. Cl.
CPC .............. *A01C 7/208* (2013.01); *A01B 61/04* (2013.01); *A01B 61/044* (2013.01); *A01B 63/002* (2013.01); *A01B 63/008* (2013.01); *A01B 63/26* (2013.01); *A01C 1/00* (2013.01); *A01C 7/201* (2013.01); *A01B 63/10* (2013.01); *A01B 73/00* (2013.01)

(58) Field of Classification Search
CPC ......... A01C 7/201; A01C 7/203; A01C 7/208; A01B 63/008; A01B 63/26
See application file for complete search history.

(56) References Cited

U.S. PATENT DOCUMENTS

| | | | | | |
|---|---|---|---|---|---|
| 4,131,221 | A | * | 12/1978 | Yeager | A01C 7/123 |
| | | | | | 111/178 |
| 4,239,086 | A | * | 12/1980 | Yeager | A01B 63/045 |
| | | | | | 172/675 |
| 4,425,857 | A | * | 1/1984 | Lienemann | A01C 5/06 |
| | | | | | 111/134 |
| 4,738,317 | A | * | 4/1988 | Bedney | A01B 63/26 |
| | | | | | 172/624.5 |
| 5,163,518 | A | | 11/1992 | Foley | |

(Continued)

FOREIGN PATENT DOCUMENTS

CA    2882829 A1    3/2014

*Primary Examiner* — Alicia Torres
(74) *Attorney, Agent, or Firm* — McKee, Voorhees & Sease, PLC

(57) ABSTRACT

A lock assembly is provided for a row planter unit to maintain the unit in a raised transport position and to relieve stress on the hydraulic system of the planter unit. The lock assembly includes a lock arm pivotally mounted to the bracket assembly of the row planter unit for selective receipt in a notch or detent on the mounting plate or mast of the bracket assembly so as to retain the row unit in the raised transport position. The lock arm can be disengaged from the bracket assembly notch or detent, such that the planter unit can be lowered to the field use position.

21 Claims, 10 Drawing Sheets

(56) References Cited

U.S. PATENT DOCUMENTS

| | | | |
|---|---|---|---|
| 6,647,904 B1* | 11/2003 | Mariman | A01B 63/26 111/62 |
| 7,025,009 B2* | 4/2006 | Roibier | A01B 63/145 111/62 |
| 2005/0120928 A1* | 6/2005 | Horn | A01B 63/26 111/62 |
| 2005/0120929 A1* | 6/2005 | Friesen | A01C 7/208 111/62 |

* cited by examiner

ROW PLANTER LOCK ASSEMBLY

CROSS-REFERENCE TO RELATED APPLICATIONS

This application claims priority to Provisional Application U.S. Ser. No. 62/409,949, filed on Oct. 19, 2016, which is herein incorporated by reference in its entirety.

FIELD OF THE INVENTION

The invention is directed to agricultural row planter units, and particularly, to a mechanical lock mechanism for the bracket assembly to retain the row unit in a raised transport position.

BACKGROUND OF THE INVENTION

Crop planting typically utilizes a plurality of row planters mounted to a tool bar by a bracket assembly having a pair of parallel link arms. The planter units can be raised and lowered between transport and planting positions by hydraulics operatively controlled by an operator in the cab of the tractor pulling the planters. Conventional row planters are maintained in the raised transport position by the tractor hydraulic system, which places significant stress on the hydraulic components, particularly when traveling over rough ground or roads. This stress leads to failure, which results in down time for repairs and related expenses, with a detrimental effect on profits.

Also, it is common for farmers in the Midwest to plant both corn and soybeans in the same season. Corn is typically planted on 30-inch rows while soybeans are typically planted on 15-inch rows. Farmers will usually mount all of the row planters on the toolbar, at 15-inch spacing, which requires every other planter to be raised and alternating planters being lowered for corn planting, and all of the planters lowered for soybean planting. The planters that are raised are spaced above the ground, while the planters which are lowered engage the ground and follow to soil surface to plant the desired seed. This need to position alternating planters in raised and lowered positions requires a quick and easy lock mechanism to hold the planters in the desired position.

Therefore, a primary objective of the present invention is a provision of an improved lock mechanism for row planters which retains the planters in a raised position.

Another objective of the present invention is the provision of a row planter having a lock assembly for minimizing or reducing stress on hydraulic components when the planter is being transported.

A further objective of the present invention is the provision of a method for locking row planters in a raised position.

Yet another objective of the present invention is the provision of a row planter lock which can be moved quickly and easily between locked and unlocked positions.

Still another objective of the present invention is the provision of a lock mechanism for the bracket assembly of a row planter unit which locks the unit against downward movement from the transport position.

Another objective of the present invention is the provision of a method of mechanically locking a row planter unit in the raised transport position so as to relieve hydraulic line pressure during transport of the row planter.

A further objective of the present invention is the provision of a locking device for a row planter mounting bracket which is safe, effective, and durable in use.

These and other objectives have become apparent from the following description of the invention.

SUMMARY OF THE INVENTION

The lock mechanism of the present invention is provided on the bracket assembly of a row planter unit. The bracket assembly includes a mount plate, a mast, and upper and lower parallel links pivotally mounted on opposite sides of the mount plate in to the mast. In a first embodiment, the lock mechanism includes a lock arm pivotally mounted to one of the links and an actuator to move the lock arm between a locked position engaging the mount plate and an unlocked position disengaged from the mount plate. Preferably, there is a lock mechanism on each side of the bracket assembly. The actuator is an over center lever. A spring extends between the actuator and the lock arm to bias the lock arm in the locked and unlocked positions as the actuator moves over center. The mount plate includes a detent or recess to receive a lower end of the lock arm when the lock arm is moved to the locked position. A stop pin on the lock arm prevents beyond the unlocked position.

In a second embodiment, the lock mechanism includes a pair of plates fixed to the lower links with a bolt extending between the plates. A lock arm is rotatably mounted on the bolt, with the opposite free end of the lock arm having a lock shaft extending transversely to engage a notch or detent on the mast of the bracket assembly. The lock arm can be selectively moved between an unlocked position disengaged from the bracket mast and an locked position engaged with the mast wherein the bracket assembly is precluded from pivoting downwardly, thereby maintaining the row unit in the raised, transport position. A pin extending through the plates prevents accidental movement of the lock arm between the unlocked and locked positions.

DETAILED DESCRIPTION OF THE PREFERRED EMBODIMENTS

Figure 1:
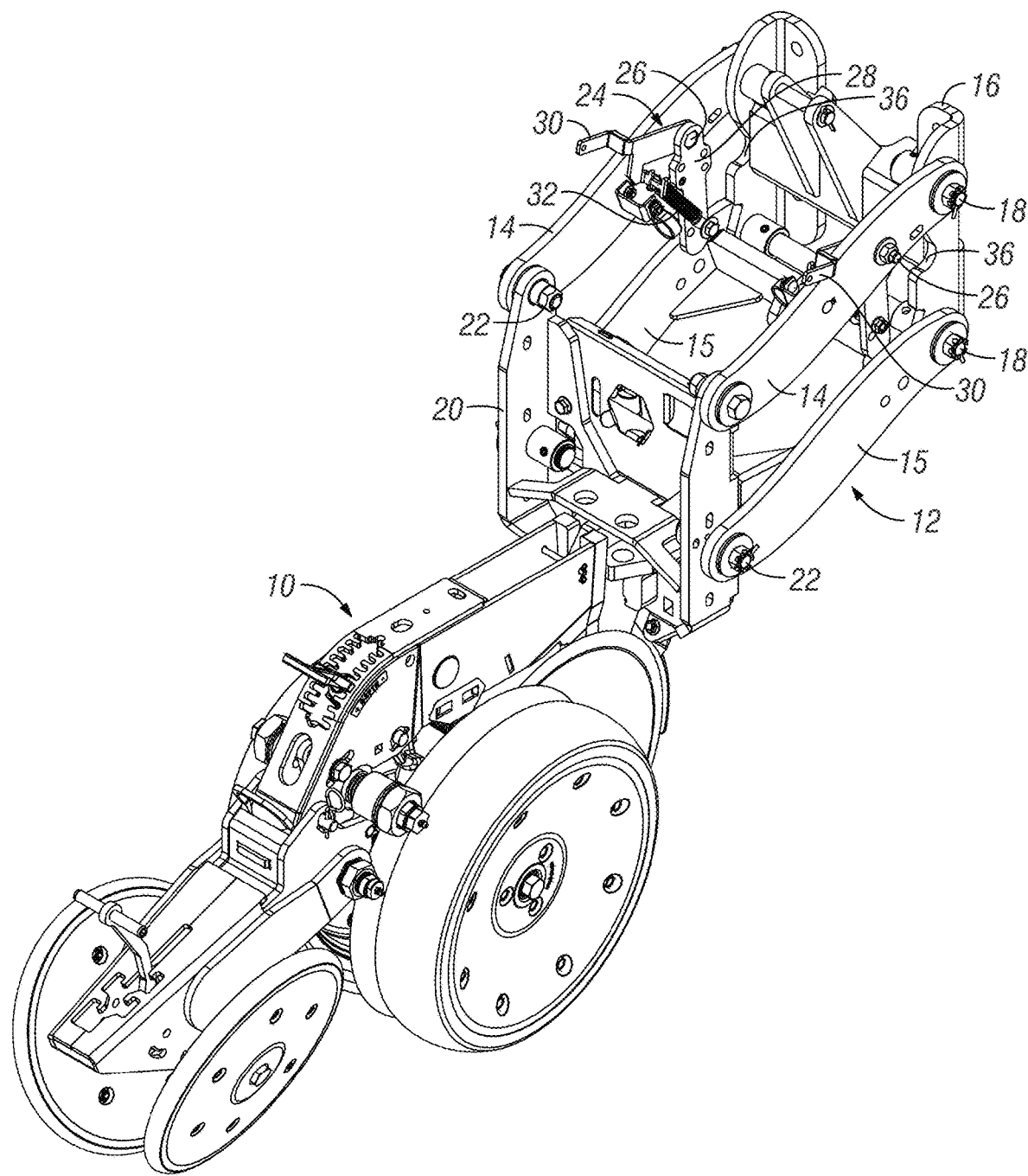
FIG. 1 is a perspective view of a row planter and bracket assembly for mounting the row unit to a tool bar, used in corn and soybean planting, and with a first embodiment of the lock mechanism of the present invention.

In FIG. 1, a row planter 10 is mounted to a tool bar (not shown) by a bracket assembly 12 having set of upper and lower, left and right, parallel link arms 14, 15. The forward ends of the link arms 14, 15 are connected to a tool bar bracket or mount plate 16 by bolts 18 which define a horizontal pivot axis. The rear ends of the link arms 14, 15 are pivotally connected to the mast 20 of the row planter 16 by a pair of bolts 22, which define a second horizontal pivot access. The hydraulic system of the tractor (not shown) is operatively connected to the link arms 14, 15 to pivot the arms about the axes defined by the bolts 18, 22 so as to raise and lower the planters 10 between a transport position and a planting position.

Figure 2:
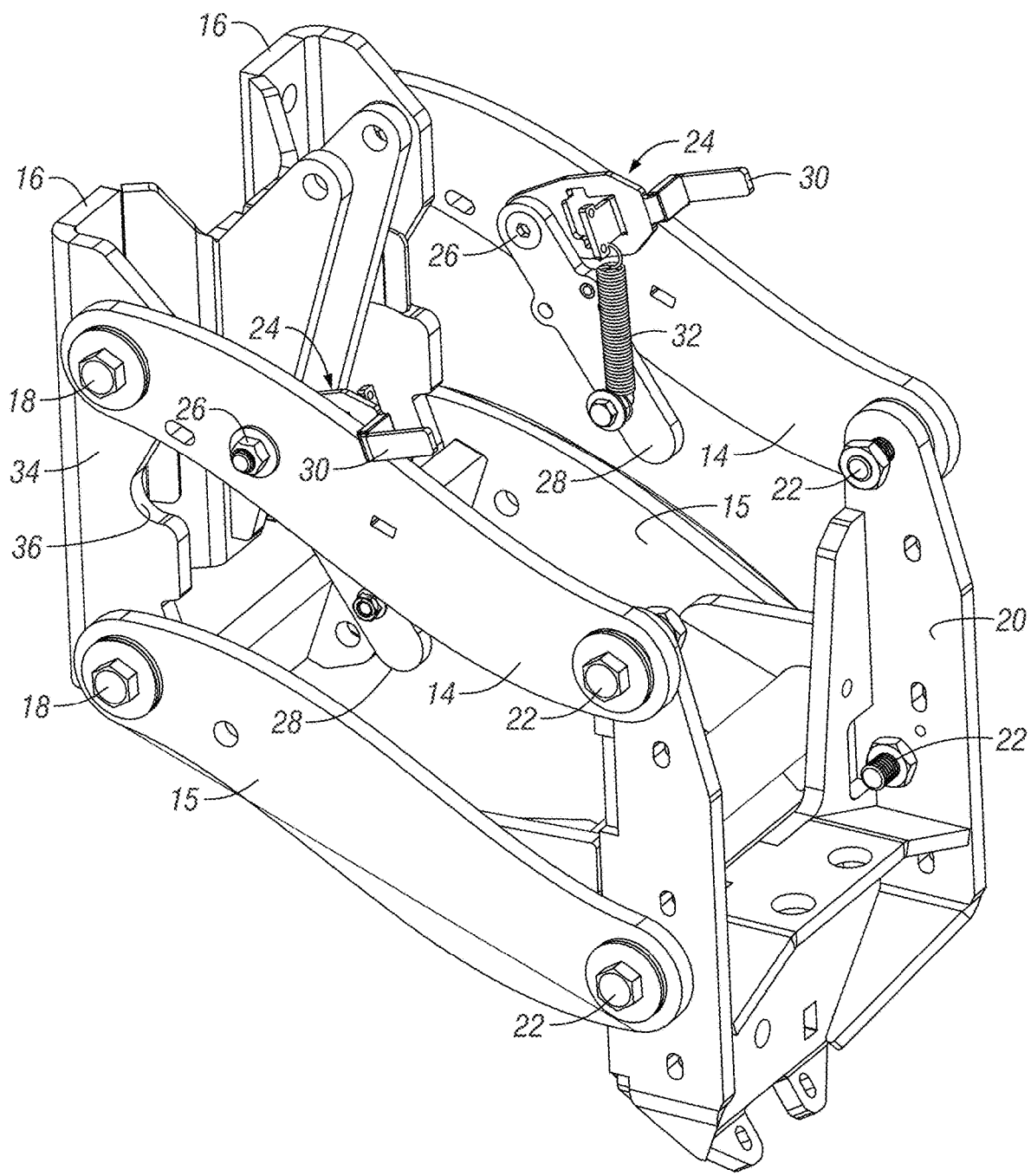
FIG. 2 is an enlarged perspective view of the bracket assembly with the lock assembly of the present invention in an unlocked position.
Figure 3:
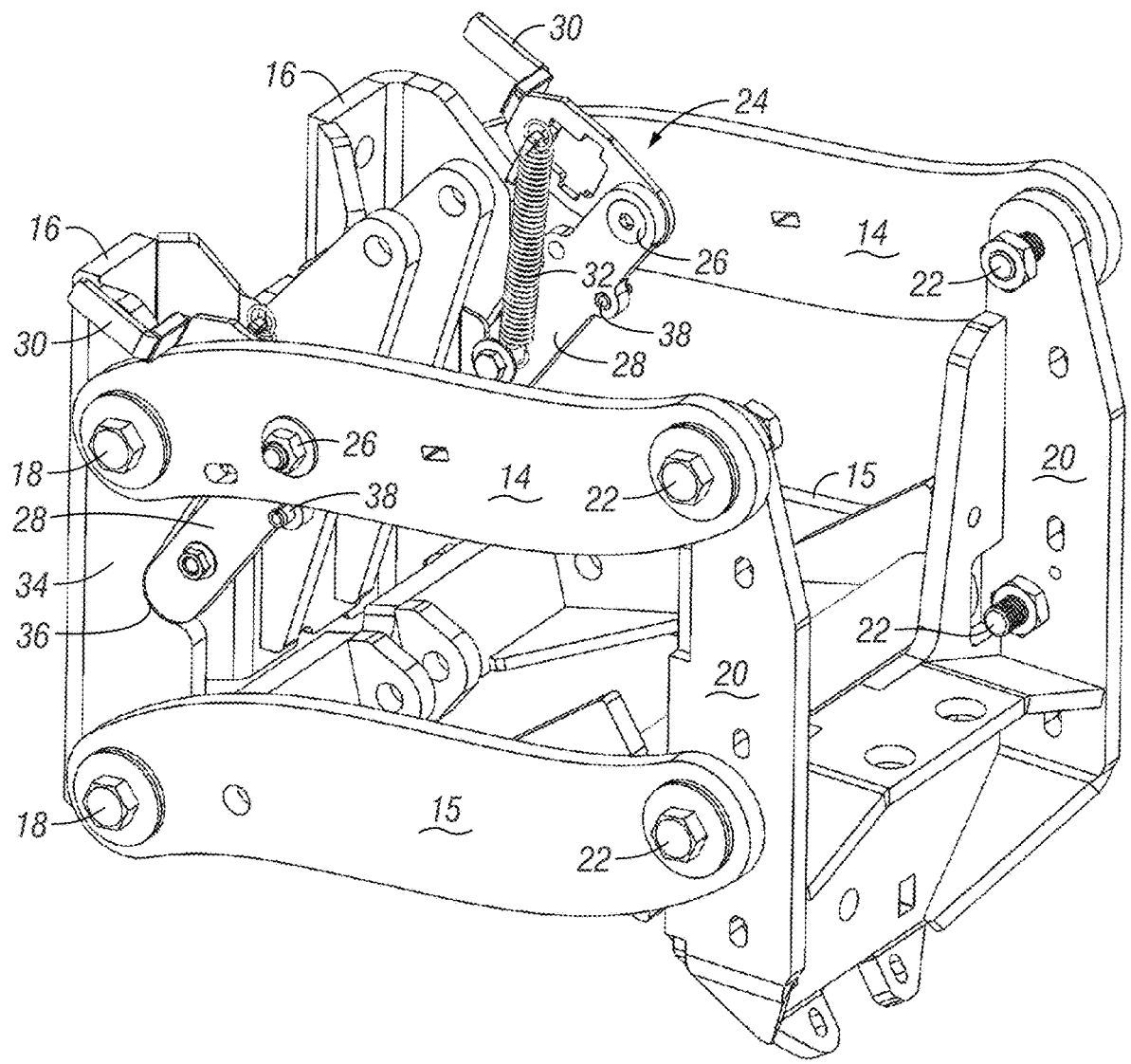
FIG. 3 is an enlarged perspective view of the bracket assembly with the lock assembly of the present invention in a locked position.
Figure 4:
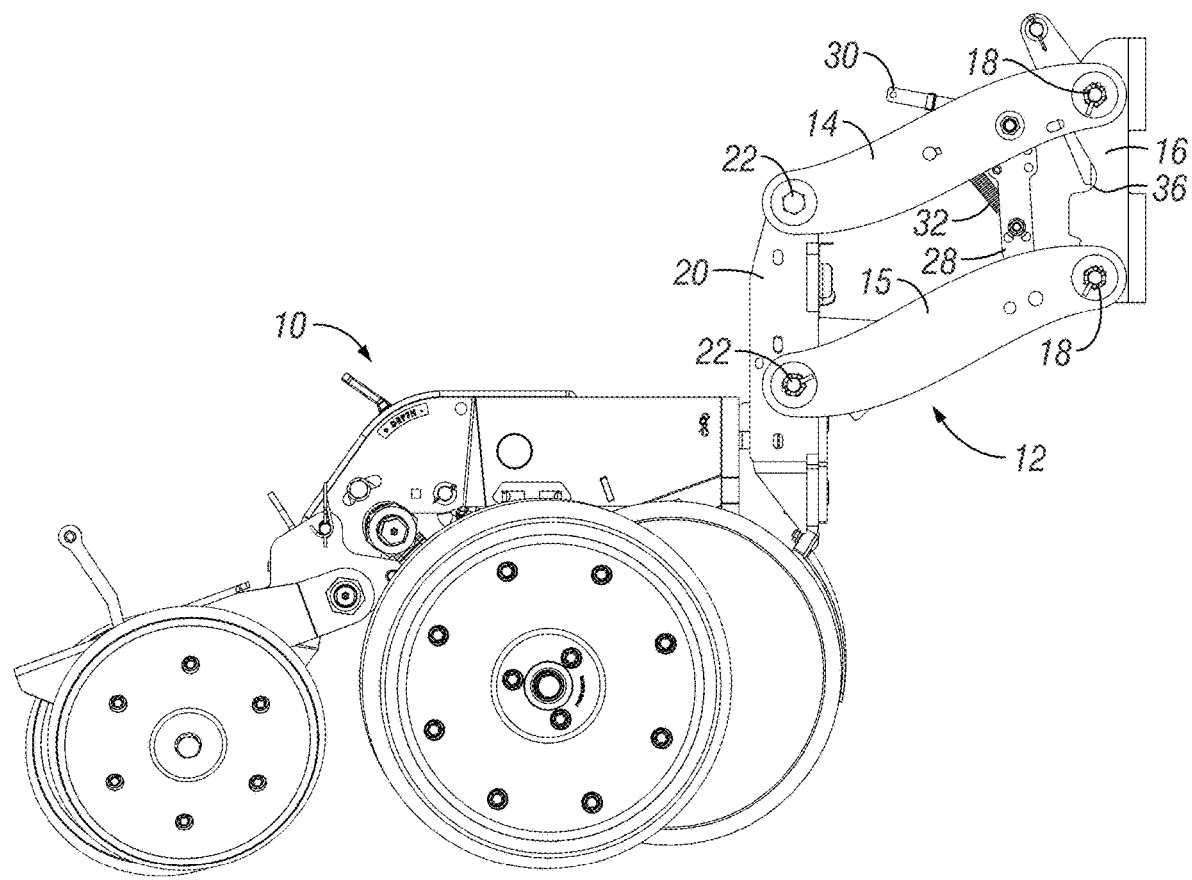
FIG. 4 is a side elevation of the row planter unit in a lowered and unlocked position.
Figure 5:
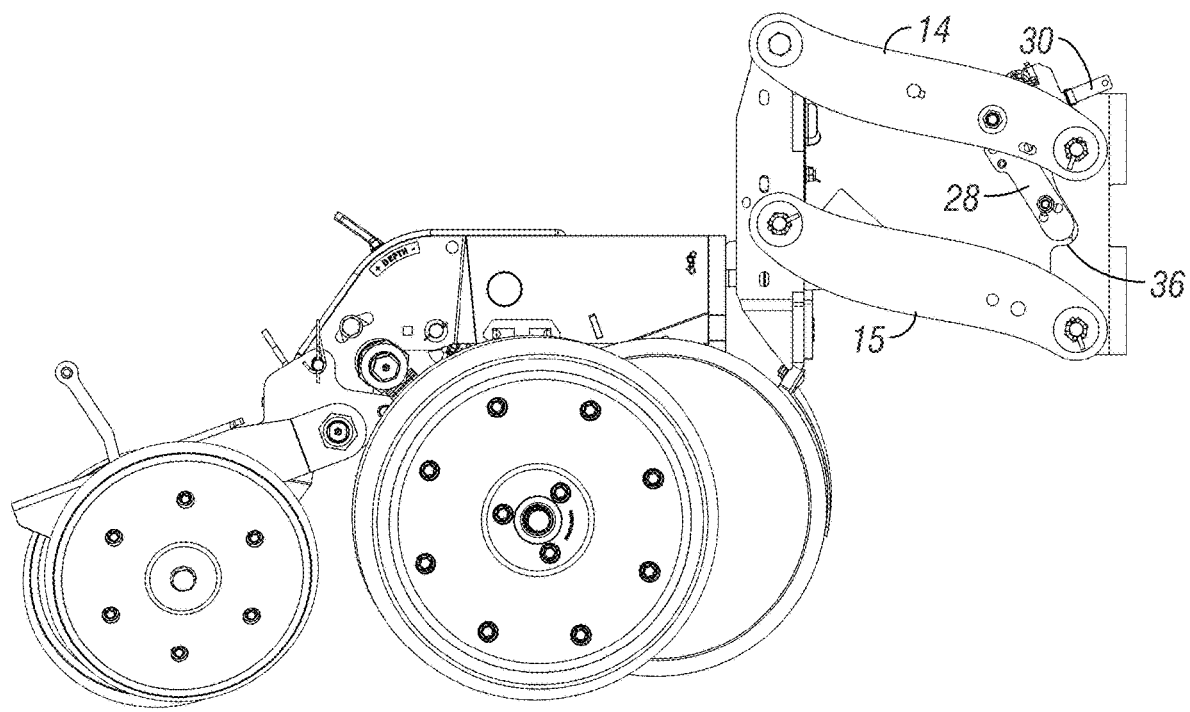
FIG. 5 is a side elevation view of the row planter unit in a raised and locked position.

The present invention is directed toward a lock assembly or mechanism 24 movable between locked and unlocked positions. More particularly, the lock assembly 24 is mounted of one of the upper link arms 14 by a pivot bolt 26. Preferably, a lock mechanism 24 is provided on each side of the bracket assembly 13, as shown in FIGS. 2 and 3. Each lock assembly 24 includes a lock arm 28 mounted on the bolt 26 and extending downward, and an actuator handle or lever or arm 30 mounted on the bolt 26 and extending upwardly. A spring 32 has opposite ends connected to the lock arm 28 and to the actuator lever 30.

The tool bar mount plate 16 includes a guide plate 34 for each of the pairs of links arms 14, 15. A detent or notch 36 is formed in each of the guide plates 34.

In operation, each lock arm 28 is manually movable between an unlocked position, shown in FIG. 2, and a locked position, shown in FIG. 3, by movement of the actuator arms 30 backward and forward to over center positions. When the actuator arm 30 is in the rear position (FIG. 2) the spring 32 pulls the lock arm 28 rearward to the unlocked position, disengaged from the notch 36, such that the row planter 10 can be raised and lowered by the tractor hydraulic system. The operator can lock the row planter 10 in the raised position by moving the actuator lever 30 forwardly over the pivot bolt 26 (FIG. 3), which allows the spring 32 to pull the lock arm 28 forwardly such that the lower end of the lock arm 28 is received in the notch or detent 36 in the guide plate 34. The planter unit 10 can then be lowered slightly so as to relieve the pressure in the hydraulic lines, such that the lock arm 28 supports the weight of the row planter, rather than having the hydraulic system support the planter weight. Thus, in the lock position, engagement of the lock arms 28 in the notches or detents 36 of the bracket plate 16 retains the row planter unit in the raised transparent position. When the lock arms 28 are disengaged from the notch 36, the row planter can be lowered to the field planting position.

Thus, to lock the planter 10 in the raised transport position, the actuator arms 30 are toggled over center in a forward direction, such that the springs 32 bias the arms 28 forwardly. As the planter unit is raised, the lock arms 28 pivot into the detents 36. To unlatch the planter unit, the actuator arms 30 are toggled over center in the rearward direction, such that the springs 32 bias the arms 28 rearwardly. Then, as the planter unit is slightly raised, the lock arms 28 pull out of the detents 36 via the springs 32 and rotate on the pivot bolts 26 until a stop pin 38 on each lock arm 28 engages an edge of the upper link arm 14.

The lock assembly of the present invention can be used on row units that plant narrow rows, such as soybeans and Canola, or wider row crops, such as corn and cotton. FIGS. 6-10 show an alternative embodiment of the lock mechanism 24A, for use in narrow row planting.

Figure 6:
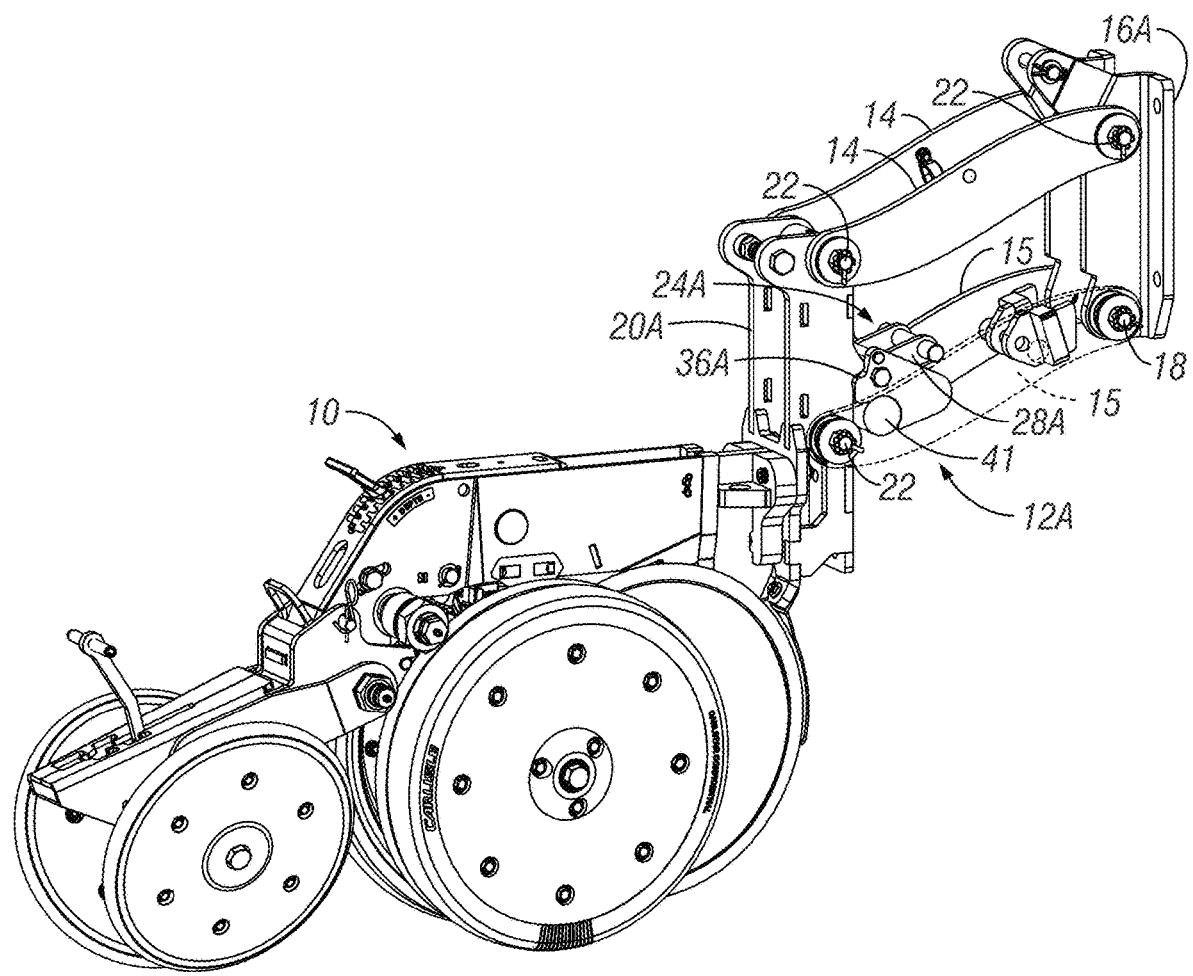
FIG. 6 is a perspective view of a row planter with a bracket assembly for narrow row planting, and with an alternative embodiment of a lock mechanism with the planter in a lowered position and the lock in an unlocked position.
Figure 7:
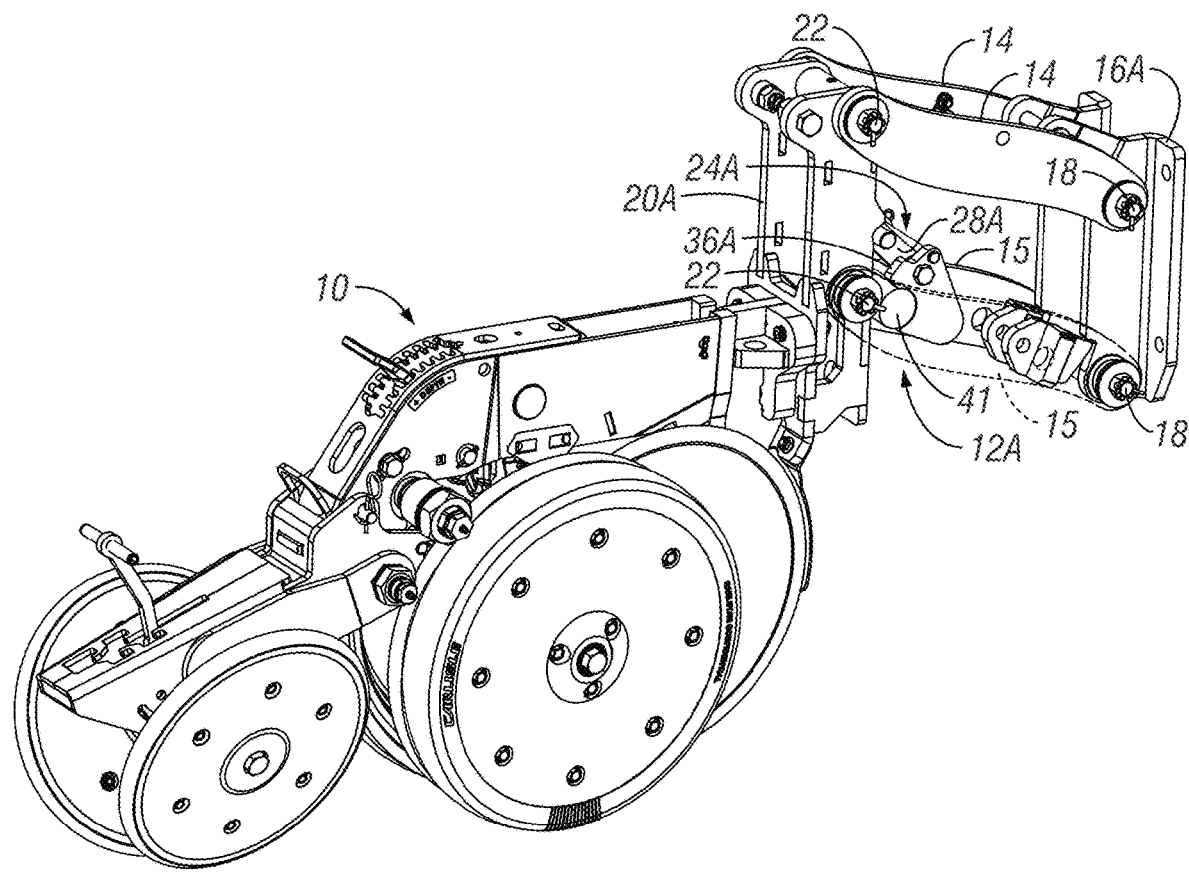
FIG. 7 is a view similar to FIG. 6, but showing the planter in a raised and locked position.
Figure 8:
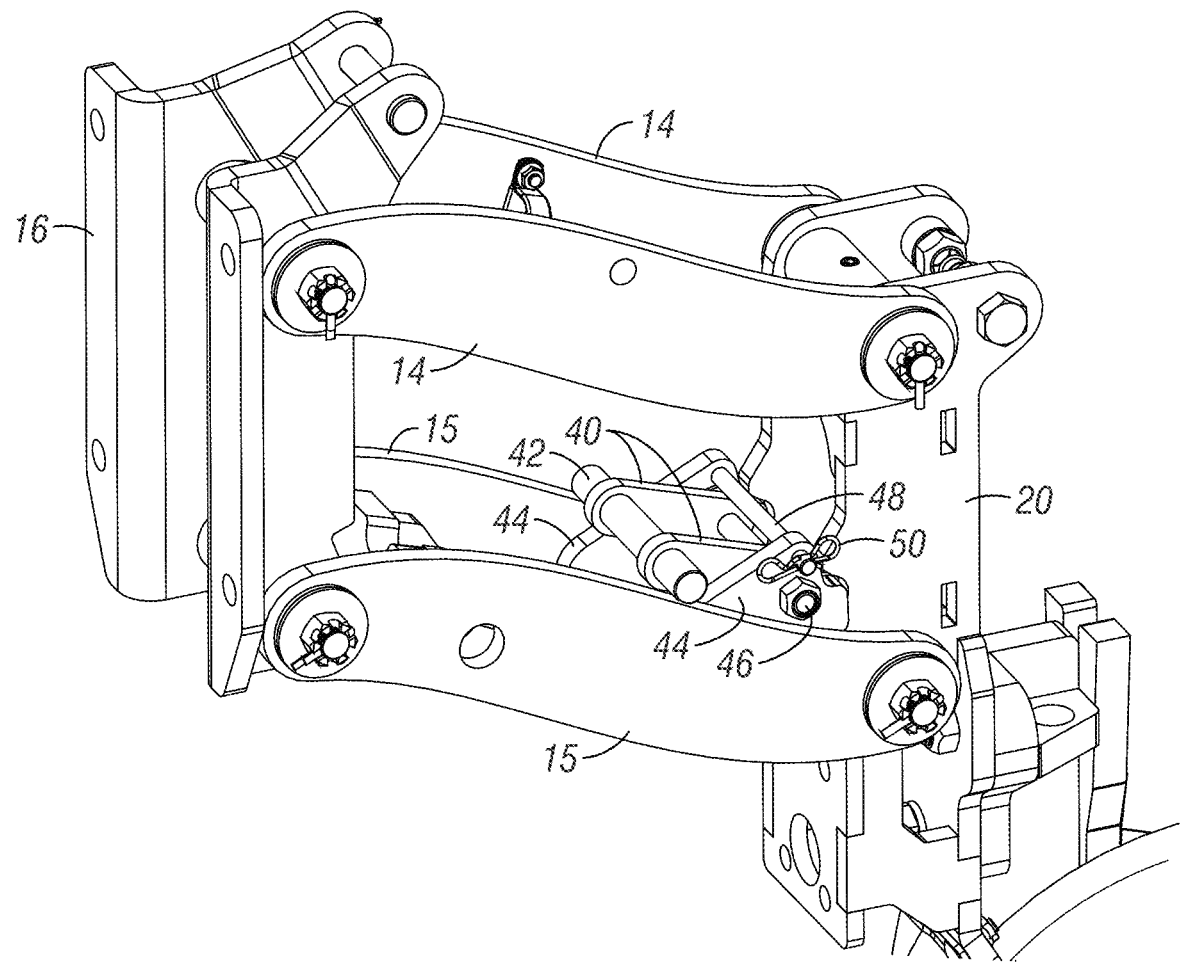
FIG. 8 is an enlarged view of the alternative lock mechanism in an unlocked position shown from the opposite side as shown in FIGS. 6 and 7.
Figure 9:
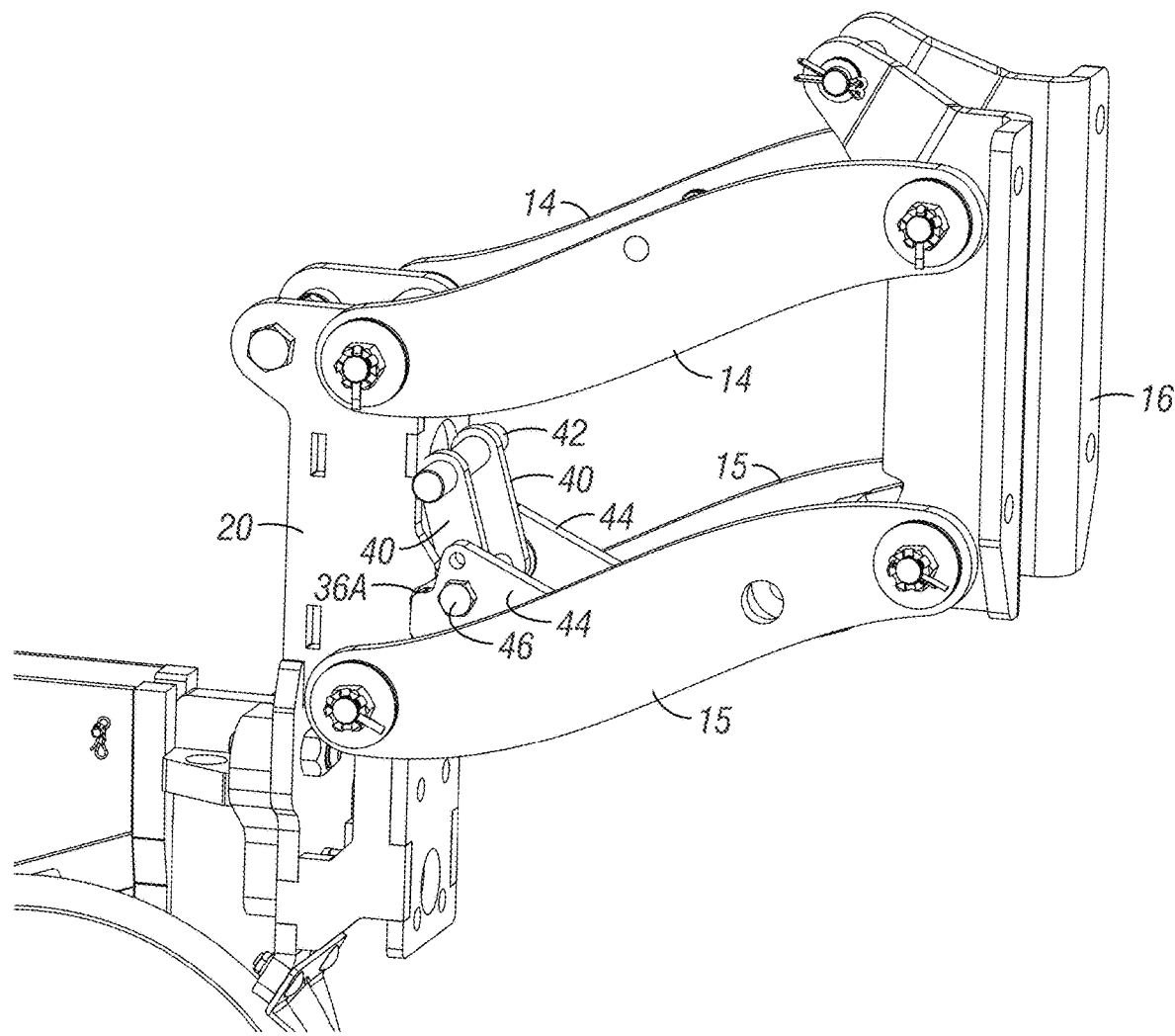
FIG. 9 is an enlarged perspective view showing the alternative lock mechanism in a pre-lock position shown from the same side as FIGS. 6 and 7.
Figure 10:
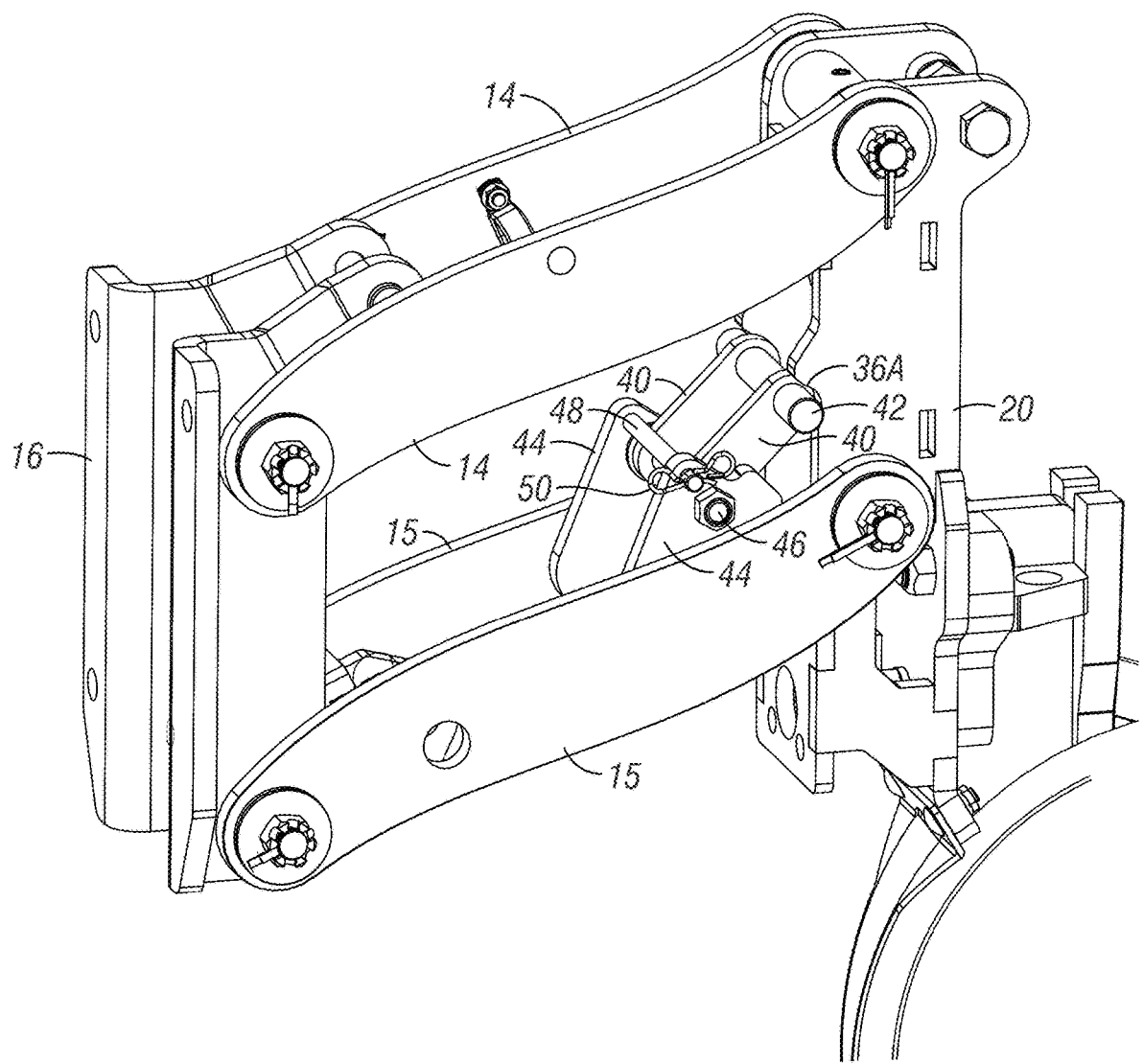
FIG. 10 is an enlarged perspective view showing the alternative lock mechanism in the locked position shown from the opposite side as shown in FIGS. 6 and 7.

The lock mechanism 24A includes a pivotal lock arm 28A, which in a preferred embodiment comprises a pair of arms 40 with a shaft 42 extending transversely through and beyond the arms 40. The arms 40 are mounted between a pair of mounting plates 44 via a bolt 46 extending through the plates 44 and through the arms 40. The arms 40 are free to rotate on the bolt 46 between a lowered or rearward unlocked position, as shown in FIGS. 6 and 8, and raised or forward locked position, as shown in FIGS. 7 and 10. In the lock position, the shaft 42 engages a notch 36A in the mast 20A of the narrow bracket assembly 12A. In the unlocked position, the shaft 42 is disengaged from the notch 36A. A bar 41 extends between and is fixed to the plates 30 and enhances stability of the bracket assembly 24A.

A pin 48 is removably inserted through holes in the plates 44 so as to retain the lock arms 40 and shaft 42 in either the unlocked position or the locked position, without the arms 40 accidentally or inadvertently moving to the opposite position. The pin 48 is retained by a clip 50. As seen in FIG. 8, the pin 48 resides on top of the lock arms 40 to prevent the arms 40 from accidentally or inadvertently moving upwardly and forwardly from the unlocked position. As seen in FIG. 10, the pin 48 is behind the lock arms 40 to prevent the arms 40 from accidentally or inadvertently moving from the locked position.

In operation, when moving from the unlocked position to the locked position of the lock assembly 24A, the planter unit is lowered. Then, the clip 50 is removed from the pin 48, and the pin 48 is removed from the plates 44, such that the lock arms 40 are free to rotate upwardly and rearwardly about the bolt 46 toward the mast 20. Then, the hydraulic system is actuated to lift the planter unit 10 to the transport position, wherein the arms 40 fall forwardly such that the shaft 42 engages the notch 36A. Then, the pin 50 can be reasserted through the plates 44, and the clip 50 placed through or on the pin 48, so as to maintain the lock arms 40 in the locked position. The hydraulic system can lower the planter slightly to relieve pressure on the hydraulic lines when the lock arms 40 are in the locked position.

It is understood that the lock assemblies 24 and 24A can be used interchangeably on the bracket assemblies 12 and 12A, as well as on other bracket assemblies.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. An improved row planter mounted on a tool bar, and having a plurality of planter units, and a bracket assembly having a front mounting plate and a rear mounting mast, with parallel links with opposite ends pivotally connected to the mounting plate and to the mounting mast so as to pivotally mount each planter unit to the toolbar for movement between raised and lowered positions, the improvement comprising:

a pivotal lock on at least one of the links movable between
    an unlocked position disengaged from the bracket assembly to allow the planter unit to be raised and lowered and a locked position engaging the mounting plate to mechanically lock the planter unit in the raised position.

2. The improved row planter of claim 1 where in the lock includes a lock arm pivotally mounted to at least one of the links for movement between the locked and unlocked positions.

3. The improved row planter of claim 2 further comprising a spring to bias the lock arm to the unlocked position.

4. The improved row planter of claim 3 further comprising an actuator handle attached to the lock arm which moves over center between the lock and unlock positions.

5. The improved row planter of claim 2 wherein the the mounting plate includes a detent to receive the lock arm in the locked position.

6. The improved row planter of claim 2 further comprising a pin on the lock arm to limit movement of the arm beyond the unlock position.

7. The improved row planter of claim 1 wherein the lock includes an over center lever and lock arm pivotally mounted on one of the links, whereby actuation of the lever moves the lock arm into engagement with the mounting plate to lock the links against pivotal movement.

8. The improved row planter of claim 7 wherein the lock arm engages a detent on the mounting plate.

9. The improved row planter of claim 1 wherein the lock seats into a notch in the plate to maintain the planter unit in the raised position.

10. The improved row planter of claim 1 wherein the lock has a first pivotally mounted end and an opposite free end for engagement with the plate in the locked position.

11. A bracket assembly for a row planter unit, comprising:
a mount plate at a forward end of the bracket assembly;
a mast at a rearward end of the bracket assembly;
a plurality of links having opposite ends pivotally mounted to the mount plate and to the mast;
a first lock arm pivotally mounted to one of the links; and
a first actuator to move the lock arm between a locked position engaging the mount plate and an unlocked position disengaged from the mount plate.

12. The bracket assembly of claim 11 wherein the actuator is an over center lever.

13. The bracket assembly of claim 11 further comprising a spring having opposite ends connected to the lock arm and to the actuator to bias the lock arm.

14. The bracket assembly of claim 11 wherein the mount plate has a recess to receive an end of the lock arm in the locked position.

15. The bracket assembly of claim 11 further comprising a stop member on the lock arm to prevent movement beyond the unlocked position.

16. The bracket assembly of claim 11 further comprising a second lock arm and second actuator on an opposite side of the mount plate from the first lock arm and first actuator.

17. A method of locking a row planter unit in a raised transport position, the row planter unit being mounted on a tool bar by pivotal link arms extending between a mast on the planter unit and a plate on the tool bar, the method comprising:
raising the row planter unit to the raised transport position;
moving a lock arm on at least one of the link arms into engagement with a portion of the plate to prevent downward movement of the planter unit.

18. The method of claim 17 wherein the lock arm is moved by actuation of an over center lever.

19. The method of claim 17 further comprising biasing the lock arm into engagement with the plate.

20. The method of claim 17 wherein the lock arm has an end that is moved into a notch in the plate to lock the planter unit against downward movement.

21. The method of claim 17 wherein the lock arm pivots into engagement with the plate.

* * * * *